United States Patent [19]

Miyake et al.

[11] Patent Number: 4,913,959

[45] Date of Patent: Apr. 3, 1990

[54] MAGNETIC RECORDING MEDIUM

[75] Inventors: Akira Miyake, Kyoto; Mikio Kishimoto, Osaka, both of Japan

[73] Assignee: Hitachi Maxell, Ltd., Osaka, Japan

[21] Appl. No.: 47,147

[22] Filed: May 8, 1987

[30] Foreign Application Priority Data

May 9, 1986 [JP] Japan .............................. 61-106371

[51] Int. Cl.⁴ ................................................. G11B 5/70
[52] U.S. Cl. .................................. 428/329; 427/128; 428/694; 428/695; 428/900
[58] Field of Search ............... 428/329, 694, 695, 900; 427/128

[56] References Cited

U.S. PATENT DOCUMENTS

| | | | |
|---|---|---|---|
| 4,565,726 | 1/1986 | Oguchi et al. | 428/694 |
| 4,567,096 | 1/1986 | Piltingsrud et al. | 428/695 |
| 4,585,697 | 4/1986 | Kato et al. | 428/694 |
| 4,678,705 | 7/1987 | Huisman et al. | 428/695 |
| 4,678,706 | 7/1987 | Tokunaga et al. | 428/695 |
| 4,687,704 | 8/1987 | Miyoshi et al. | 428/900 |
| 4,740,419 | 4/1988 | Asai et al. | 428/900 |

FOREIGN PATENT DOCUMENTS 0078539  5/1983  European Pat. Off. .
0238068  9/1987  European Pat. Off. .

*Primary Examiner*—Paul J. Thibodeau
*Attorney, Agent, or Firm*—Birch, Stewart, Kolasch & Birch

[57] ABSTRACT

A magnetic recording medium with improved durability is provided and comprises a non-magnetic substrate and a magnetic layer formed thereon containing magnetic powder of a platelet hexagonal system of ferrite particles, granular non-magnetic powder, a lubricant and a binder, the granular non-magnetic powder being contained in an amount of from 0.1 to 30 parts by weight per 100 parts by weight of the platelet hexagonal system of ferrite particles.

4 Claims, No Drawings

MAGNETIC RECORDING MEDIUM

BACKGROUND OF THE INVENTION

1. Field of the Invention

The present invention relates to a magnetic recording medium, such as a magnetic disc or magnetic tape. More particularly, it relates to a magnetic recording medium comprising a magnetic layer containing, as the magnetic recording element, a platelet hexagonal system of ferrite powder.

2. Description of the Prior Art

Generally, a magnetic recording medium such as a magnetic tape comprises a non-magnetic substrate and a magnetic layer thereon which contains magnetic powder as a magnetic recording element and a binder. Conventionally, as magnetic powder, magnetic powder consisting of acicular particles such as $\gamma\text{-}Fe_2O_3$, $Fe_3O_4$, Co-containing $\gamma\text{-}Fe_2O_3$ or metallic Fe is used. In recording and reproduction, usually a magnetic component in the direction parallel to a plane of the magnetic layer is used by orienting the magnetic powder along the surface of the non-magnetic substrate during the formation of the magnetic layer.

Recently, a high recording density is highly desired. For this end, magnetic powder consisting of platelet hexagonal system of ferrite particles having a magnetic easy axis perpendicular to a granular plate, for example, Ba, Sr and Pb ferrite particles, is increasingly used so as to utilize a magnetic component perpendicular to the plane of the magnetic layer in order to obtain high output power in a short wavelength region.

Such a magnetic recording medium is required to have good durability of the magnetic layer, since the medium slidingly contacts with a magnetic head and the like at a large relative rate during recording or reproduction. Conventionally, for improving such durability, it is proposed and practiced to incorporate a lubricant such as higher fatty acids and their esters, silicone oils and fluorinated oils in a magnetic layer to impart lubricity to the surface of the magnetic layer and decrease its friction coefficient.

When the platelet hexagonal system of ferrite particles referred to above is used as the magnetic powder, the orientation and filling ratio are improved in comparison to the magnetic powder comprising conventional acicular particles, but the effect of the lubricant is decreased, so that the magnetic layer and in turn the magnetic recording medium have insufficient durability.

As a result of the extensive study by the present inventors to overcome the above problems of the platelet hexagonal ferrite particles system, it has been found that when a magnetic paint comprising the platelet hexagonal ferrite particles is coated on a non-magnetic substrate to orient them, surfaces of the platelet particles tend to easily overlap each other because of their platelet shape, and the particles intimately contact each other by a magnetic drawing force since each particle acts as a granular magnet which generates opposite poles on two platelet surfaces and not as simple platelet particles, such as pigment particles. In the case of a magnetic recording medium utilizing the above magnetic powder, the volume of the voids in the magnetic layer for containing the lubricant is much smaller than that in the case of utilizing the magnetic powder comprising conventional acicular particles, thus the effect of the lubricant is not exhibited and the durability is deteriorated.

SUMMARY OF THE INVENTION

Therefore, it is an object of the present invention to provide a magnetic recording medium which comprises a magnetic layer containing platelet hexagonal ferrite particles as the magnetic powder and has enough voids in the magnetic layer to retain the lubricant and thus good electromagnetic conversion properties and durability.

This and other objects are accomplished by providing a magnetic recording medium which comprises a non-magnetic substrate and a magnetic layer formed thereon containing magnetic powder consisting of a system of platelet hexagonal ferrite particles, granular non-magnetic powder, a lubricant and a binder, the granular non-magnetic powder being contained in an amount of from 0.1 to 30 parts by weight per 100 parts by weight of the platelet hexagonal ferrite particles together with the lubricant.

DETAILED DESCRIPTION OF THE INVENTION

The present invention has been completed based on the finding that when the granular non-magnetic powder is used in addition to a lubricant, voids are formed in the magnetic layer so that a sufficient amount of the lubricant in retained in the magnetic layer so as to effectively exhibit its function to give a magnetic recording medium having high electromagnetic conversion properties and good durability.

According to the present invention, the granular non-magnetic powder is used in an amount of from 0.1 to 30 parts by weight, preferably 2 to 20 parts by weight, per 100 parts by weight of the platelet hexagonal system of ferrite particles. Since the magnetic layer contains the non-magnetic powder in such a specific amount and also the lubricant, the effect of the lubricant is greatly enhanced, and the durability of the magnetic recording medium is significantly improved and retained.

The reason why the durability of the magnetic recording medium is improved is not clear, but may be as follows. When the magnetic layer is formed by coating a magnetic paint on the non-magnetic substrate, the particles of the granular, non-magnetic powder contained in the specific amount are present between adjacent surfaces of the platelet hexagonal ferrite particles so as to prevent the surfaces from making intimate contact. Voids are formed between the platelet particles and the lubricant is contained in the voids so that the lubricant is retained in the resulting magnetic layer formed in a sufficient amount. Therefore, the surface of the magnetic layer generally exhibits good lubrication and has a long life due to the lubricant provided from the inside of the magnetic layer, even if the magnetic recording medium is subjected to recording and reproduction for a long time.

On the contrary, when the non-magnetic powder consists of platelet particles, surfaces of the particles of the non-magnetic powder and of the magnetic powder intimately contact each other even if the non-magnetic power is present in the system of platelet hexagonal ferrite particles. Since, therefore, the voids for containing the lubricant are rarely formed and maintained, little lubricant is contained or retained in the magnetic layer and most of the lubricant floats on the surface of the magnetic layer. As result, lubricity of the magnetic layer can be good at the beginning of use but lost in a short time.

When an amount of the non-magnetic powder is less than 0.1 part by weight per 100 parts by weight of the platelet hexagonal ferrite particles, the number of the voids formed by the non-magnetic powder is too small, and the substantial space in the whole magnetic layer decreases so that sufficient amount of the lubricant is not present in the magnetic layer and as a result, the magnetic recording medium has unsatisfactory durability. When the amount of the non-magnetic powder exceeds 30 parts by weight, the magnetic characteristics are degraded due to the decrease of in the relative amount of the magnetic powder. Further, the binding property of the magnetic layer is degraded and the effect of improving the durability is not achieved.

As the granular, non-magnetic powder, various kinds of inorganic and organic powder may be used. Suitable is that powder having a hardness greater than the platelet hexagonal ferrite particle system. The granular, non-magnetic powder having the greater hardness not only acts as an abrasive which increases the strength of the magnetic layer and enhances abrasion resistance, but also, when it is present between the ferrite particles and contacts with the ferrite particles, exhibits such a special function that it forms the voids for containing the lubricant and prevents a decrease of in the voids due to deformation of the powder. Thus, the use of the granular, non-magnetic powder enhances the durability of the magnetic recording medium.

Examples of the preferable granular, non-magnetic powder includes powder which comprises particles such as $\alpha\text{-}Al_2O_3$ (Vickers hardness: 2,500 kg/mm$^2$), $Cr_2O_3$ (2,800 kg/mm$^2$), $\alpha\text{-}SiC$ (2,500 kg/mm$^2$), TiC (3,200 kg/mm$^2$), WC (2,000 kg/mm$^2$) $Si_3N_4$ (2,200 kg/mm$^2$), $ZrO_2$ (1,400 kg/mm$^2$) and the like and a mixture of two or more thereof, since the platelet hexagonal ferrite particles generally have about 1,000 to 3,500 kg/mm$^2$ of Vickers hardness.

The granular non-magnetic powder has preferably an average particle size of from 10 to 75% of the thickness of the magnetic layer formed. When the average particle size is too large in comparison with the thickness of the magnetic layer, a large number of the powder particles protrude from the magnetic layer surface to deteriorate the smoothness of the magnetic layer surface and to degrade the electromagnetic conversion property, and the particles drop off from the magnetic layer to degrade the durability of the medium. When the average size is too small, the particles can not sufficiently act as the abrasive and thus hardly improve the durability which would result from the improvement of abrasion resistance of the magnetic layer.

As the platelet hexagonal system of ferrite particles used as the magnetic powder, exemplary are particles which have a magnetic easy axis perpendicular to the plate of the particle, such as barium ferrite, strontium ferrite or lead ferrite. Particles having an average platelet ratio (average platelet diameter/average platelet thickness) of from about 2 to 30 is particularly suitable in view of the magnetic property or electromagnetic conversion property of the magnetic recording medium. Preferably, the average platelet diameter of the platelet hexagonal ferrite particles is not less than 0.06 $\mu$m, since it has a certain effect on the durability of the magnetic recording medium. The larger the average platelet diameter, the better the durability.

In addition to the platelet hexagonal ferrite particles system, magnetic powder of conventional acicular particles such as $\gamma\text{-}Fe_2O_3$, $Fe_3O_4$, Co-containing $\gamma\text{-}Fe_2O_3$, metalic iron or the like can be used in an amount of less than 60% by weight based on the whole magnetic powder weight.

The lubricant used according to the present invention may be any of the conventional lubricants which are known as lubricants contained in a magnetic layer of the magnetic recording medium. For example, higher aliphatic acids and esters thereof, silicone oils or fluorinated oils can be used. A lubricant in a liquid or semisolid state at normal temperature is particularly suitable. Preferred examples of the lubricant are oleyl oleate, 2-ethylhexyl oleate, octyl oleate, hexyl oleate, isoamyl stearate, butyl stearate, 2-ethylhexyl myristate, butylcellosolve stearate, butylcellosolve oleate, glyceryl trioleate, trimethylolpropane trioleate, isocetyl stearate, isocetyl oleate, myristic acid, lauric acid, palmitic acid, stearic acid, dimethylpolysiloxane, Crytox 143, Crytox 1500, Crytox 1600 (DuPont), Fomblin Z (Montedison) and the like. A mixture of two or more of them can be used.

Preferably, the lubricant is used in an amount of from 2 to 25 parts by weight per 100 parts of the magnetic powder containing the the platelet hexagonal system of ferrite particles. When the amount of the lubricant is more than 25 parts by weight, the magnetic layer surface becomes tacky so that the lubricant adheres to and contaminates a contacting subject such as a magnetic head or guide of a recording and reproducing machine. When it is less than 2 parts by weight, the smoothness of the surface of the magnetic layer is not satisfactory and than the durability of the magnetic recording medium is not sufficiently improved.

The binder may be any of the conventional ones known to be used in the magnetic layer of a magnetic recording medium and includes vinyl chloride-vinyl acetate copolymers, cellulose type resins, butyral resins, polyurethane resins, polyester resins, isocyanate compounds, and a mixture of two or more of them.

Other conventional additives such as a dispersant, an antistatic agent or a filler may be used.

The magnetic recording medium of the present invention may be produced by conventional methods. For example, the magnetic powder containing the hexagonal ferrite system, and optionally other magnetic particles, is mixed with the granular, non-magnetic powder, the lubricant, the binder and optionally other additives to prepare a magnetic paint. Next, the magnetic paint is coated on one side or both sides of the non-magnetic substrate made of, for example, a polyester film, and dried. The coated magnetic layer may be surface treated by, for example, calendering and the coated substrate is cut to a desirable shape and size. The substrate may have an electrically conductive layer comprising electrically conductive material such as carbon black. When only one side of the non-magnetic substrate is provided with the magnetic layer, the other side may be provided with a back coat layer.

The magnetic recording medium according to the present invention has good durability, as described in the above, since the lubricant in the magnetic layer can be contained in the voids which are formed by the particles of the granular, non-magnetic powder present between plate surfaces of the platelet hexagonal ferrite particles, and the lubricant is dispersed homogeneously in the magnetic layer. Preferably, the magnetic layer has a void volume of more than 20% by volume. The void volume can be desirably changed according to the size and ratio of the platelet hexagonal system and granular non-magnetic powder, ratio of both to the binder, and temperature and pressure of calendering after the formation of the magnetic layer. When the void volume is too small, the amount of the lubricant contained in the magnetic layer is too small to improve the durability of the magnetic recording medium.

PREFERRED EMBODIMENTS

The present invention will be hereinafter explained further in detail by following examples, wherein parts are by weight unless otherwise indicated.

EXAMPLES 1-21

Following components were compounded homogeneously in a ball mill for 72 hours to prepare a magnetic paint.

| | |
|---|---|
| Platelet hexagonal system barium ferrite magnetic powder (see Table 1) | 100 parts |
| Non-magnetic powder (see Table 1) | 10-25 parts |
| Vinyl chloride-vinyl acetate-vinyl alcohol copolymer (VAGH, a trade name of U.C.C., USA) | 12.5 parts |
| Polyurethane resin (Pandex T 5250, a trade name of Dainippon Ink Co., Japan) | 7.5 parts |
| Trifunctional polyisocyanate compound (Colonate L, a trade name of Nippon Polyurethane Co., Japan) | 5 parts |
| Lubricant (see Table 1) | 10 parts |
| Toluene | 185 parts |
| Cyclohexane | 185 parts |

The magnetic paint was coated on both sides of a non-magnetic substrate made of a polyethylene terephthalate film having a thickness of 75 $\mu$m and having conductive carbon black layers each having a thickness of 1 $\mu$m on the both sides of the film to give a thickness of a magnetic layer after drying as shown in Table 1, and dried to prepare the magnetic layer followed by calendering. Then the film with the magnetic layers was blanked to produce a magnetic disc having a diameter of 20.02 cm.

COMPARATIVE EXAMPLES 1-8

In the same manner as in Examples 1-21 but using the platelet hexagonal system barium ferrite magnetic powder, non-magnetic powder and a lubricant shown in Table 2 in amounts shown in Table 2 and changing a thickness of the magnetic layer as shown in Table 2, magnetic discs were produced. In Comparative Example 1, non-magnetic powder was not used.

The discs produced in the Examples and Comparative Examples were tested in surface roughness and durability of the magnetic layer. The results are shown in Tables 1 and 2.

The surface roughness of the magnetic layer is represented in terms of a center line average height (Ra value) which is measured by a tracer type surface roughness meter. The durability is represented in terms of the number of the revolutions at which the surface of the disc is damaged when the magnetic disc is caused to rotate at a rate of 360 rpm in a floppy disc drive unit. The void volume of the magnetic layer is expressed by weight increase of the magnetic disc when the lubricant in the magnetic layer formed from magnetic paint is washed off with Freon-TF or hexane and then the lubricant is again completely impregnated in the magnetic layer.

TABLE 1

| Example No. | Ba ferrite powder Average platelet diameter ($\mu$m) | Non-magnetic powder Amount (part) | Component | Average particle size ($\mu$m) | Lubricant | Magnetic layer Thickness ($\mu$m) | Void volume (% by volume) | Surface roughness ($\mu$m) | Durability ($\times 10^4$ revolutions) |
|---|---|---|---|---|---|---|---|---|---|
| 1 | 0.06 | 20 | Granular $\alpha$-Al$_2$O$_3$ | 0.25 | Oleyl oleate | 1.0 | 25.8 | 0.010 | 380 |
| 2 | 0.06 | 20 | ↑ | 0.25 | ↑ | 0.5 | 25.1 | 0.010 | 370 |
| 3 | 0.06 | 20 | ↑ | 0.43 | ↑ | 1.0 | 26.4 | 0.011 | 400 |
| 4 | 0.08 | 20 | ↑ | 0.25 | ↑ | 1.0 | 26.2 | 0.011 | 580 |
| 5 | 0.08 | 20 | ↑ | 0.25 | ↑ | 0.5 | 25.7 | 0.011 | 560 |
| 6 | 0.08 | 20 | ↑ | 0.25 | ↑ | 0.5 | 19.1 | 0.009 | 325 |
| 7 | 0.08 | 20 | ↑ | 0.43 | ↑ | 1.0 | 26.4 | 0.012 | 620 |
| 8 | 0.10 | 20 | ↑ | 0.25 | ↑ | 1.0 | 26.7 | 0.012 | 850 |
| 9 | 0.10 | 20 | ↑ | 0.25 | ↑ | 0.5 | 26.2 | 0.012 | 840 |
| 10 | 0.10 | 20 | ↑ | 0.25 | ↑ | 3.0 | 27.1 | 0.011 | 330 |
| 11 | 0.10 | 20 | ↑ | 0.43 | ↑ | 1.0 | 27.4 | 0.013 | 890 |
| 12 | 0.10 | 20 | ↑ | 0.78 | ↑ | 1.0 | 27.8 | 0.018 | 340 |
| 13 | 0.04 | 20 | Granular $\alpha$-Al$_2$O$_3$ | 0.25 | Oleyl oleate | 0.5 | 24.6 | 0.010 | 320 |
| 14 | 0.05 | 20 | ↑ | 0.25 | ↑ | 0.5 | 24.9 | 0.010 | 340 |
| 15 | 0.08 | 10 | ↑ | 0.25 | ↑ | 0.5 | 24.2 | 0.011 | 540 |
| 16 | 0.08 | 25 | ↑ | 0.25 | ↑ | 0.5 | 27.3 | 0.013 | 580 |
| 17 | 0.08 | 20 | ↑ | 0.25 | 2-Ethylhexyl oleate | 0.5 | 25.7 | 0.010 | 540 |
| 18 | 0.08 | 20 | ↑ | 0.25 | Glyceryl trioleate | 0.5 | 25.8 | 0.010 | 560 |
| 19 | 0.08 | 20 | Granular Cr$_2$O$_3$ | 0.18 | Oleyl oleate | 0.5 | 25.5 | 0.010 | 550 |
| 20 | 0.08 | 20 | Granular $\alpha$-SiC | 0.25 | ↑ | 0.5 | 25.7 | 0.011 | 570 |
| 21 | 0.08 | 20 | Granular CaCO$_3$ | 0.25 | ↑ | 0.5 | 25.7 | 0.011 | 305 |

TABLE 2

| Example No. | Non-magnetic powder | | | | | Magnetic layer | | | Durability |
|---|---|---|---|---|---|---|---|---|---|
| | Ba ferrite powder Average platelet diameter (μm) | Amount (part) | Component | Average particle size (μm) | Lubricant | Thickness (μm) | Void volume (% by volume) | Surface roughness (μm) | (× 10⁴ revolutions) |
| Comp. 1 | 0.08 | 0 | — | — | Oleyl oleate | 0.5 | 16.2 | 0.009 | 2 |
| Comp. 2 | 0.08 | 0.05 | Granular α-Al$_2$O$_3$ | 0.25 | ↑ | 0.5 | 16.3 | 0.009 | 3 |
| Comp. 3 | 0.08 | 32 | ↑ | 0.25 | ↑ | 0.5 | 31.4 | 0.020 | 260 |
| Comp. 4 | 0.08 | 40 | ↑ | 0.25 | ↑ | 0.5 | 32.3 | 0.024 | 200 |
| Comp. 5 | 0.06 | 20 | Platelet α-Al$_2$O$_3$ | 0.25* | ↑ | 0.5 | 18.4 | 0.010 | 40 |
| Comp. 6 | 0.08 | 20 | ↑ | 0.25* | ↑ | 0.5 | 18.6 | 0.011 | 60 |
| Comp. 7 | 0.10 | 20 | ↑ | 0.25* | ↑ | 0.5 | 18.9 | 0.012 | 100 |
| Comp. 8 | 0.10 | 20 | ↑ | 0.45* | ↑ | 0.5 | 19.2 | 0.013 | 120 |

Note:
*An average plate diameter of the non-magnetic powder.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The results of Tables 1 and 2 show that the magnetic disc according to the present invention which contains the magnetic powder of the platelet hexagonal ferrite particles and a specific amount of the granular non-magnetic powder in the magnetic layer (Examples 1–21) has much greater effect of improving the durability than that of the magnetic disc not containing non-magnetic powder (Comparative Example 1). The magnetic discs containing the platelet non-magnetic powder (Comparative Examples 5–8) and the magnetic discs containing the granular non-magnetic powder in an amount out of the range of 0.1 to 30 parts by weight per 100 parts by weight of the platelet hexagonal system ferrite particles (Comparative Examples 2–4) have poorer effect of improving the durability.

Among the magnetic discs according to the present invention, those in which the granular non-magnetic powder have an average particle size of 10–75% of the magnetic layer thickness, the non-magnetic powder is harder than the platelet hexagonal system ferrite particles, the platelet hexagonal system ferrite particles have an average platelet diameter of more than 0.06 μm, and the magnetic layer has a void volume of more than 20% by volume (Examples 1–5, 7–9, 11 and 15–20) have better durability than ones which do not satisfy these conditions (Example 6, 10, 12–14 and 21).

What is claimed is:

1. A magnetic recording medium of improved durability which comprises a non-magnetic substrate and a magnetic layer formed thereon containing magnetic powder consisting of platelet hexagonal ferrite particles, non-magnetic granular powder particles having a Vickers hardness greater than that of said platelet hexagonal magnetic ferrite particles, a lubricant present in an amount of from 2–25 parts by weight per 100 parts of said magnetic ferrite particles and a binder, said non-magnetic granular powder particles being present in an amount of from 0.1 to 30 parts by weight per 100 parts by weight of said platelet hexagonal ferrite particles, said magnetic layer having a void volume created by the presence of said non-magnetic granular powder particles of not less than 20% by volume, with said lubricant being contained in said voids.

2. The magnetic recording medium of claim 1 wherein said magnetic layer is formed to a specified thickness and said non-magnetic granular powder particles have an average particle size of from 10 to 75% of said magnetic layer thickness.

3. The magnetic recording medium of claim 1 wherein said platelet hexagonal ferrite particles have an average platelet diameter of not less than 0.06 μm.

4. The magnetic recording medium of claim 1 wherein said magnetic powder comprises particles having a magnetic easy axis perpendicular to the plate of said particle, said ferrite particles being formed of at least one element selected from the group consisting of barium, strontium and lead.

* * * * *